Oct. 28, 1969  E. BAUER  3,475,566
BATTERY HOLDER AND SWITCH FOR HEARING AID UNIT
Filed Jan. 4, 1966  6 Sheets-Sheet 2

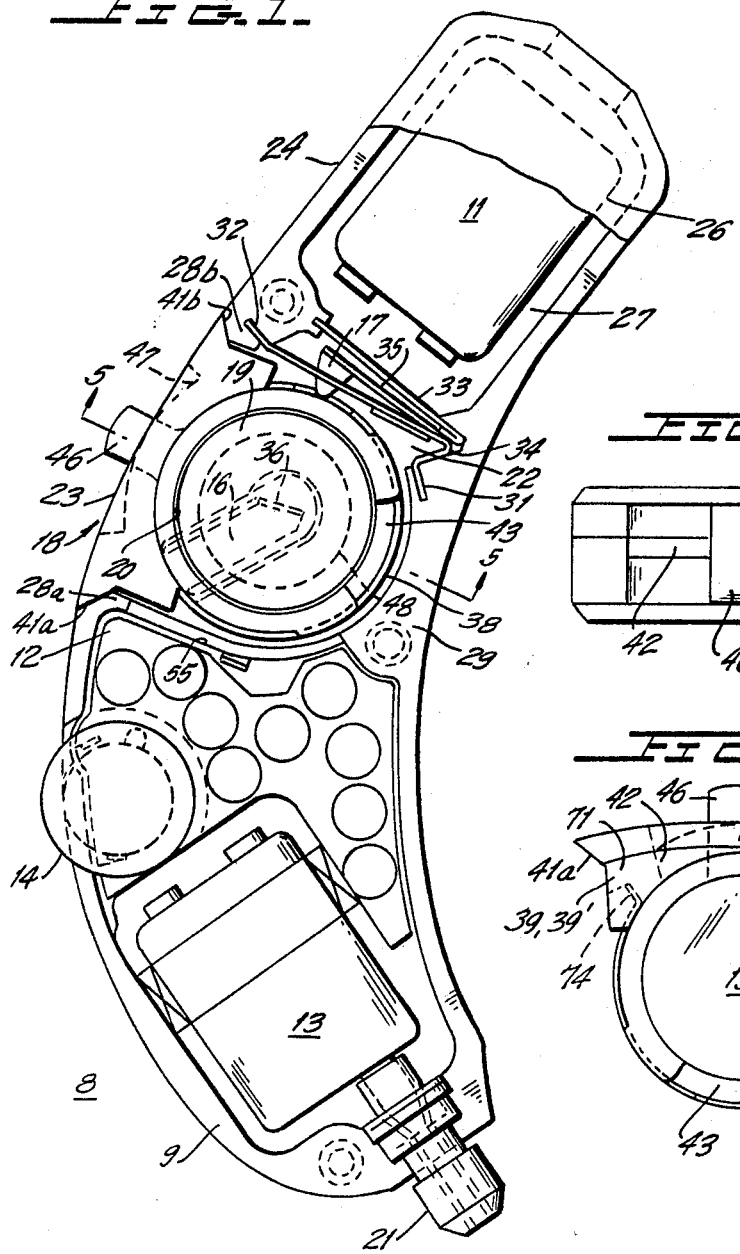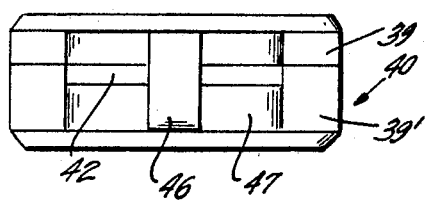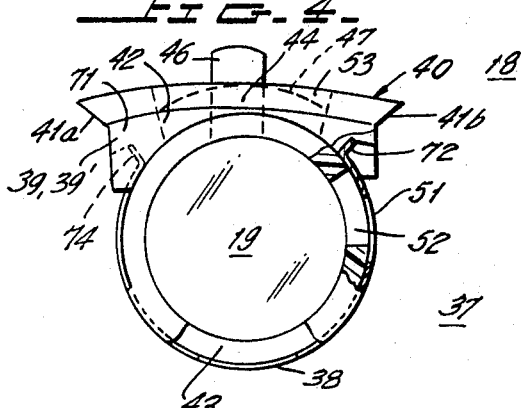

INVENTOR.
EGON BAUER
BY
OSTROLENK, FABER, GERB & SOFFEN
ATTORNEYS

Oct. 28, 1969     E. BAUER     3,475,566
BATTERY HOLDER AND SWITCH FOR HEARING AID UNIT
Filed Jan. 4, 1966     6 Sheets-Sheet 3
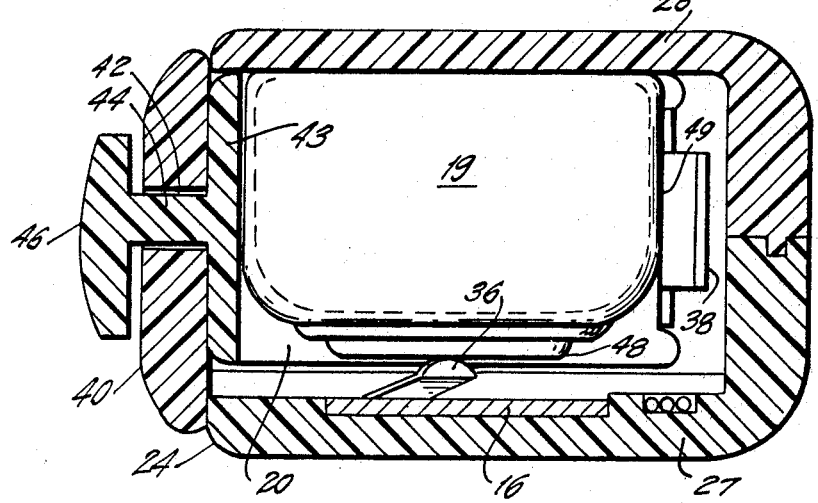
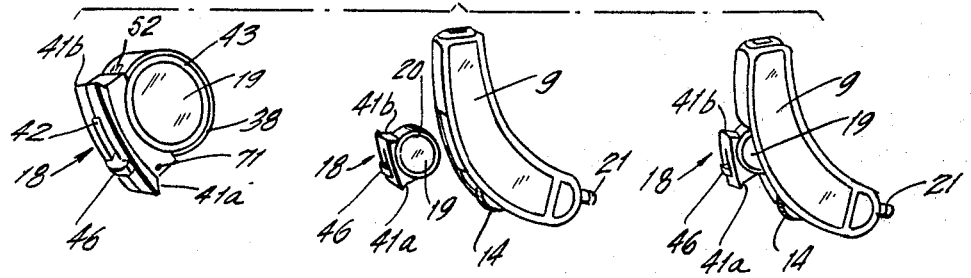
INVENTOR.
EGON BAUER
BY
OSTROLENK, FABER, GERB & SOFFEN
ATTORNEYS Oct. 28, 1969      E. BAUER      3,475,566
BATTERY HOLDER AND SWITCH FOR HEARING AID UNIT
Filed Jan. 4, 1966      6 Sheets-Sheet 4
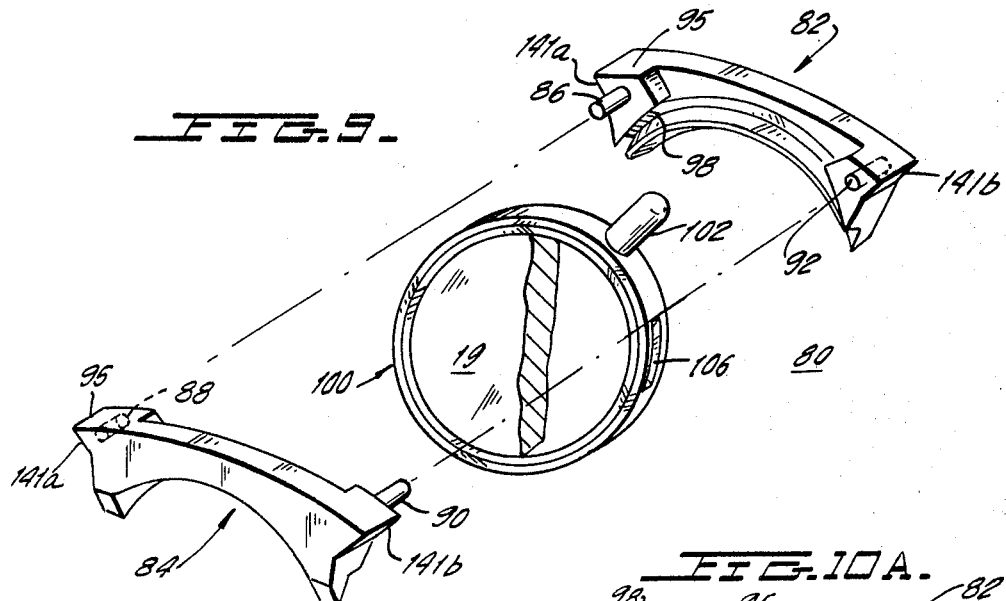
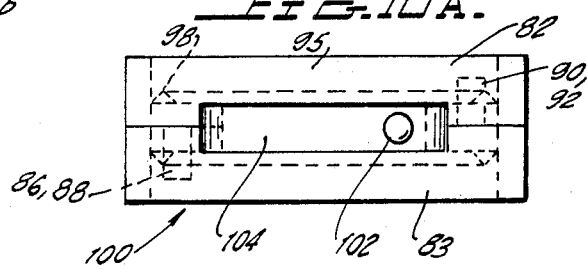
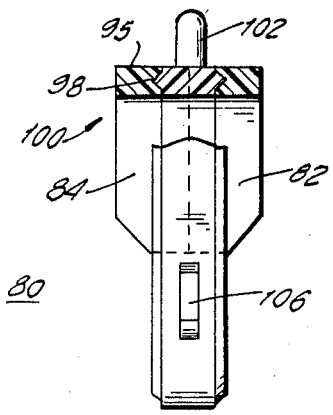
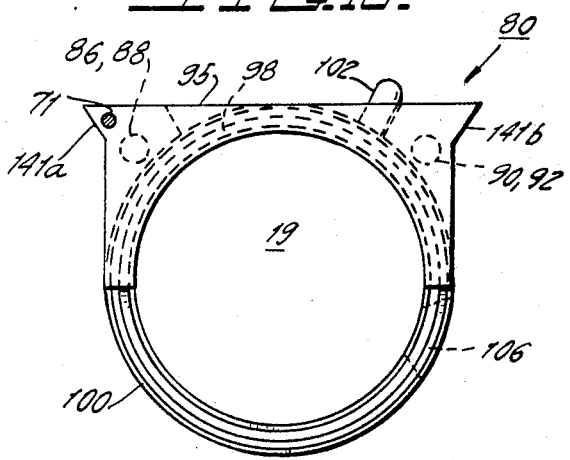
INVENTOR.
EGON BAUER
BY
OSTROLENK, FABER, GERB & SOFFEN
ATTORNEYS

INVENTOR.
EGON BAUER
BY
OSTROLENK, FABER, GERB & SOFFEN
ATTORNEYS

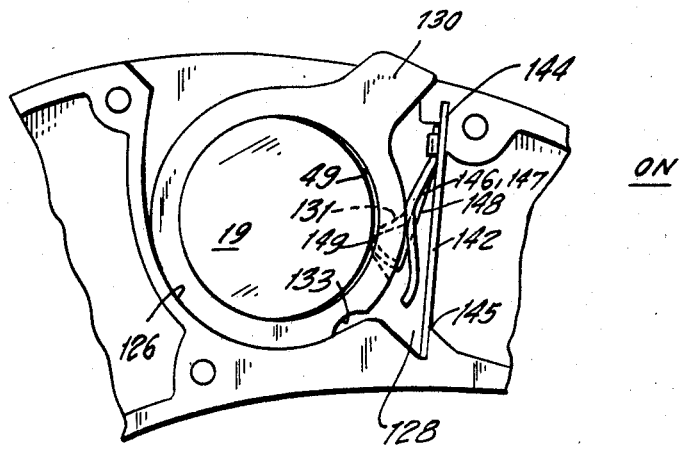
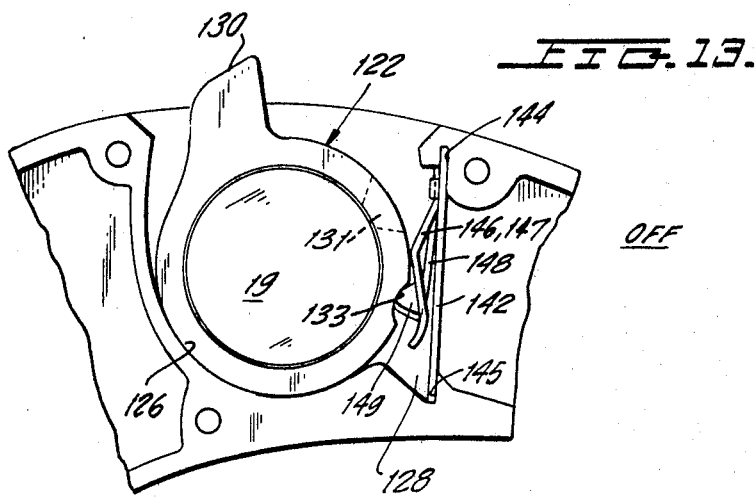

United States Patent Office 3,475,566
Patented Oct. 28, 1969

3,475,566
BATTERY HOLDER AND SWITCH FOR HEARING AID UNIT
Egon Bauer, Hartsdale, N.Y., assignor to Sonotone Corporation, Elmsford, N.Y., a corporation of New York
Filed Jan. 4, 1966, Ser. No. 518,690
Int. Cl. H04r 25/00
U.S. Cl. 179—107                                2 Claims

ABSTRACT OF THE DISCLOSURE

In combination with a hearing aid device there is disclosed a battery holder and switch of the type which may be completely removed as a separate unit from the hearing aid device during battery replacement, and thereafter reinserted within a complementary internal chamber provided along one of the hearing aid walls. The hearing aid chamber for receiving the combined battery-switch is preferably located at an intermediate region of the hearing aid thereby, permitting maximum separation of the hearing aid microphone and earphone transducers to minimize feedback therebetween, and allow maximum amplifier gain. Various embodiments are disclosed all of which maintain a substantial seal in either the switch ON or switch OFF positions, or during movement between these two positions, in order to inhibit the entry of contaminants within the hearing aid instrument.

---

This invention relates to hearing aid devices, and more particularly to a combined battery holder and ON-OFF switch assembly for insertion within the battery compartment of a hearing aid.

Present day hearing aid assemblies are undergoing substantial miniaturization to a point that where the casing enclosing all elements thereof they may be conveniently placed behind the user's ear, carried in the frame of eyeglasses or completely inserted within the ear. Such hearing aid casing assemblies include a battery holder for readily inserting and replacing the battery source of power, as well as an ON-OFF switch for energizing the hearing aid unit during the require periods of use. Such functions generally require space in the hearing aid assembly at an externally accessible position so as to conveniently permit their use by those of average or sometimes less than average dexterity. The requirement for such a removable battery holder and accompanying ON-OFF switch as in the past necessitated separate openings within the hearing aid housing. Such separate openings have permitted excessive accumulations of contaminants, such as dust, lint, perspiration, hair sprays, tonics and the like, to enter the interior of the housing where they have accumulated and have had deleterious effect upon the operation of the hearing aid unit. Also, such separate openings (1) weaken the housing casing, (2) require room which may not be readily available in the increasingly compact miniature hearing aids presently available and detract from the overall aesthetics of the unit.

Some efforts in the past to alleviate this condition have been provided by a corner mounted combination battery holder and switch which may be pivoted outward of the hearing aid unit. However, the location of the switch at the corner region of the hearing aid disadvantageously prevents either the microphone or earphone transducer to be located at this position. It has been found that maximum separation of these transducers is required in order to minimize the feedback therebetween. Hence, the corner mounted battery holder does not permit maximum feedback suppression with a given overall hearing aid size, thereby preventing the most effective utilization of available volume.

The instant invention solves these problems by the provision of a novel and extremely simplified combined battery cell holder and switch structure removably inserted within an internal chamber of the hearing aid casing. The term "removable" is herein defined as a battery holder and switch assembly which may be completely detached from the hearing aid assembly as a separate unit during battery replacement.

In accordance with some of the illustrated forms of my invention an inner and outer housing is provided with the battery unit located within the inner housing. A switch handle which is molded as part of the inner battery housing protrudes through a slot in the outer housing portion to permit relative movement between "ON" and "OFF" positions. The outer housing is mounted in the hearing aid enclosure and the inner housing is so constructed that it rotates relative to the enclosure. As it so rotates between its ON and OFF positions, it will provide a substantial seal of the slot opening of the enclosure and thereby prevent the entry of contaminants.

In accordance with another form of my invention, the battery carrier is constructed as an integral unitary member which rotatively seats within the hearing aid housing compartment and is provided with a simplified detent configuration for cooperative engagement with spring fingers mounted within the battery compartment. Also, the battery carrier substantially seals the enclosure opening in the ON and OFF positions. The entire assembly of either form may be conveniently press-fit within a cooperating portions of the hearing aid enclosure, and closely conforms to the housing configuration so as to minimize the possibility of contamination. The instant invention also permits maximum utilization of available space and eliminates the function of two contacts required in the previous type units.

It is therefore seen that the basic concept of the instant invention resides in providing an extremely simplified battery holder and combined switch, for use in conjunction with a hearing aid assembly, wherein a single opening is provided and the battery holder when located within the hearing aid assembly substantially seals such single opening.

One object of the invention therefore is to provide an improved battery holder and switch arrangement that is easily removable from the battery compartment of a hearing aid assembly and is constructed to reduce the accessibility of the assembly to the entry of contaminating materials.

Another object of the invention is to provide an improved combination battery holder and switch of simplified design that may be completely removed from a hearing assembly for battery replacement purposes or switch servicing without dismantling the assembly.

Another object of the invention is to increase the flexibility of component mounting in hearing aid assemblies utilizing an integral battery holder and switch of the pullout variety wherein the battery contact portions serve as the switch contacts.

An additional object of the invention is to provide a combined battery holder and switch, insertable within a single opening of a hearing aid housing, and constructed to substantially seal such opening against the entry of contaminants.

A further object of the invention is to mechanically polarize a combination battery holder and switch to assure the energizing of the electrical hearing aid components with a predetermined polarity.

A still further object of the invention is to provide a removable battery compartment switch that is mountable flush with the sides of an opening in a hearing aid for both the ON and OFF positions of the switch.

Another object of the invention is to reduce the space required within a hearing aid assembly for the effective utilization of a combination battery holder and switch.

These and related objects are accomplished by one arrangement in accordance with the instant invention, in which the combination battery compartment and switch comprises two essentially concentric housings having annular portions that are rotatably engageable. The switch handle is made integral with the inner rotating housing (which carries the battery) and protrudes through a slot in the outer housing to the exterior of the switch. The contact between the rotatable housings at the interior portion of the slot provides a blind opening for the switch handle and thereby blocks contamination of the switch through the slot. Additionally, an opening is provided in a selectable portion of a single wall of the hearing aid housing to expose an inner chamber for removably mounting the switch assembly.

The switch assembly, after receiving a battery cell, is dropped into the chamber through the opening without any rotational or pivotal motion. The externally accessible portion of the cell carrying switch has a periphery complementary to that of the enclosure opening, and seating means are provided at the sides of the opening for mounting the external portion of the switch flush with the wall to define a continuation of the wall over the slot. The switch handle is movable to its ON or OFF positions without disturbing the flush engagement, thereby avoiding the projecting portion utilized in prior designs.

According to one form of my invention constructed in accordance with the general arrangement described above, the outer housing member includes complementary externally directed cover portions, in conjunction with an internally directed arcuate member. The inner housing member containing the battery is rotatably mounted in the circumferential region defined by the cover portion and the annular segment member by the provision of a band-like member secured at its ends to the outer housing and defining a peripherally arcuate volume for rotatively receiving the inner housing. In accordance with a modified form thereof, the additional arcuate bandlike member may be dispensed with, with the complementary casing cover portions including an arcuate groove, which rotatably seats the inner housing member.

In accordance with another arrangement of my invention, the functions of the inner and outer housing members, and combined battery carrier, may be integrated into a single member. This single member rotatably seats within a complementary internally configured region of the hearing aid enclosure and is detent retained within the enclosure at its ON and OFF positions, as well as traveling therebetween. Further, the configuration of such single member at its external region will be such so as to substantially seal the battery compartment against the entry of contaminating materials.

According to another aspect of the invention two sets of opposed bevelled portions are provided on the outer switch portions and on the sides of the enclosure opening for seating the switch in the enclosure. The battery carrying switch assembly is, however, eccentric with respect to the compartment, thereby providing an overhang when the switch is in a non-preferred longitudinal orientation with respect to the hearing aid housing. Thus, engagement between the fixed contacts and the chamber and the battery carried by the switch is prevented unless the longitudinal orientation of the switch is proper.

In another aspect of the invention, the switch assembly is mounted within a chamber disposed in a central or intermediate portion of the hearing aid enclosure, and the microphone and sound reproducer of the hearing aid apparatus are disposed on longitudinally opposite extremes of the elongated enclosure to minimize acoustic and magnetic feedback between the reproducer and the microphone.

The nature of the present invention, the manner in which it accomplishes the above and related objects, and its various advantages and features are more fully set forth in the following detailed description taken in connection with the drawings in which:

FIG. 1 is a front view of an assembled hearing aid unit utilizing the battery and switch mounting arrangement of one form of the instant invention with a portion of the front wall of the hearing aid enclosure cut away to expose certain of the interior components;

FIGS. 3 and 4 are top and front views, respectively, of the battery compartment switch shown in FIGS. 1 and 2;

FIG. 5 is a side elevation of the battery compartment switch mounted in place in the enclosure, taken approximately on the line 5—5 of FIG. 1;

Figure 6:
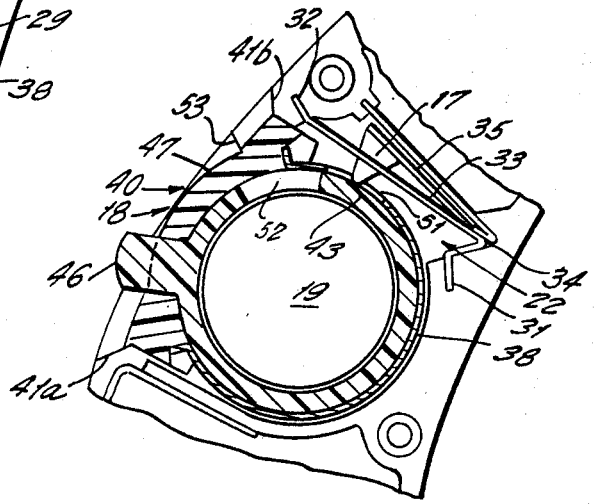
Figure 7:
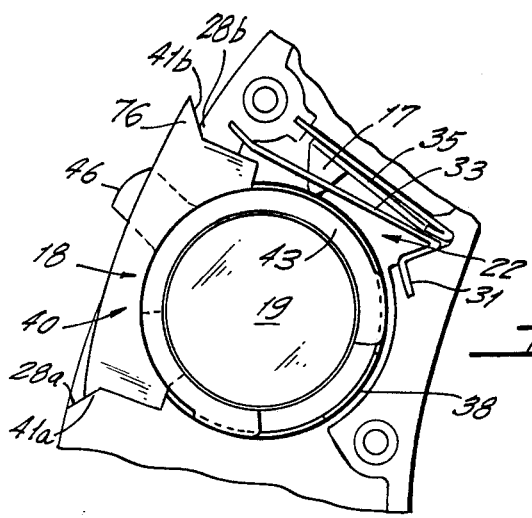

FIG. 6 is a front sectional view of the battery compartment switch of the present invention mounted within the enclosure of FIG. 1 and disposed in its OFF position; and FIG. 7 is a front view partly cut away of the battery and switch mounting arrangement of FIG. 1, illustrating the misalignment between the switch and the enclosure when the switch is longitudinally disposed opposite to the position shown in FIG. 1;

FIG. 8 is a perspective view showing the combined battery holder and switch assembly of the instant invention and the manner in which it is sequentially inserted within the battery compartment of the hearing aid unit.

Figure 11:
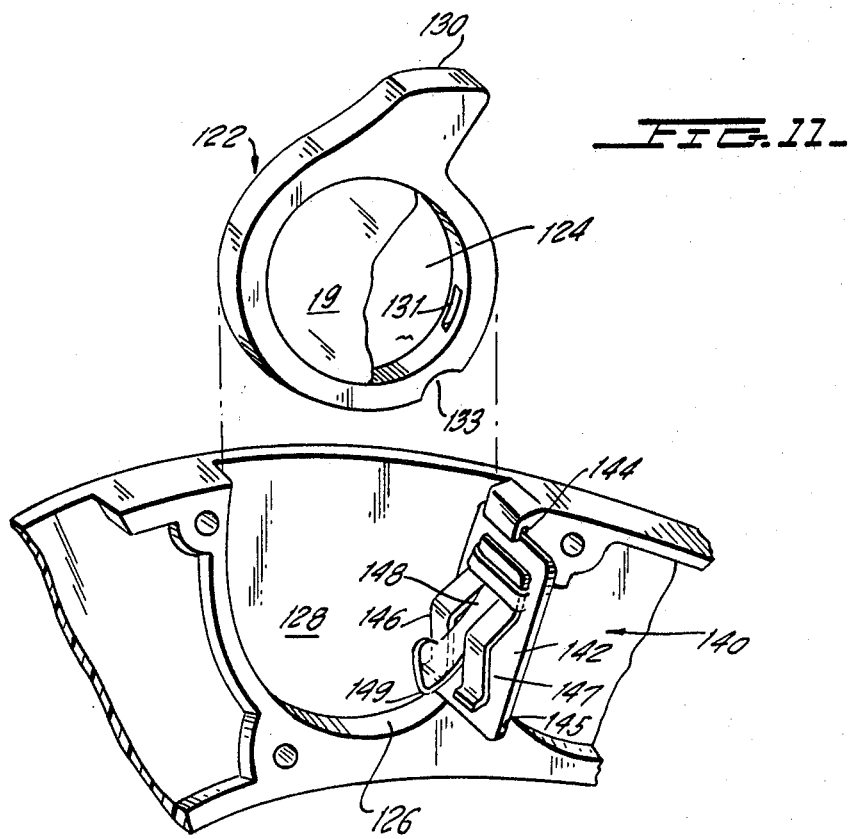
Figure 12:
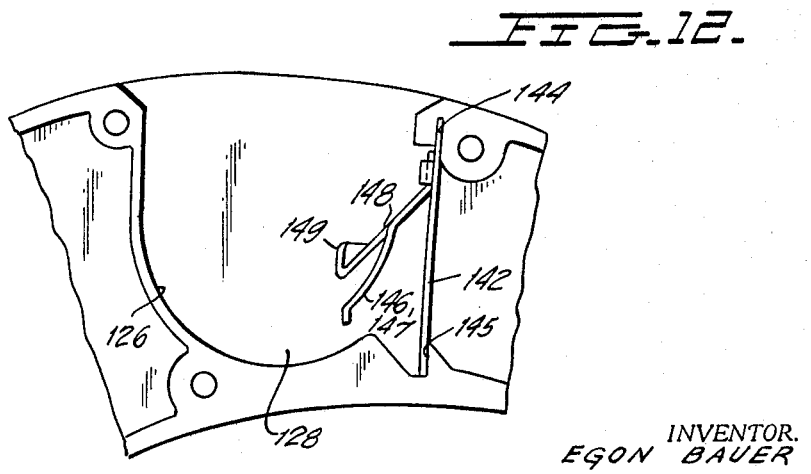

FIG. 8A shows the combined battery holder and switch assembly in exploded perspective;

FIG. 9 is an exploded perspective view of a modified battery holder and switch assembly constructed in accordance with the general arrangement shown in FIGS. 1–8 above;

FIGS. 10, 10A and 10B are front elevation, top and side views, respectively, of the modified battery holder switch assembly shown in FIG. 9;

FIG. 11 is an exploded perspective view of still another form of battery holder and switch assembly constructed in accordance with the general teachings of my invention, shown in conjunction with its cooperating detent seating and contact spring assembly;

FIG. 12 is a cutaway view of the hearing aid enclosure adapted to receive the unitary battery holder and switch assembly shown in FIG. 11, at a condition prior to the insertion of the battery-switch assembly;

FIG. 13 corresponds to FIG. 12, but shows the battery holder and switch assembly inserted within its intended hearing aid compartment, and in the OFF position;

FIG. 14 corresponds to FIG. 13, but shows the switch assembly disposed in the ON position.

Referring to the drawing, FIG. 1 shows a complete hearing aid assembly 8 employing the battery and switch mounting according to one form of the instant invention. The assembly 8 comprises a molded outer enclosure 9 contoured to fit behind a human ear either as an extension of a temple bow piece of a pair of spectacles or as an isolated unit. Mounted within the enclosure 9 are a microphone 11, an amplifier chassis board 12, a sound reproducer 13, a manually accessible volume control knob 14, a pair of spring switch contacts 16, 17, and a battery compartment switch 18. The switch 18 is adapted to receive a hearing aid battery 19 through a central aperture 20 thereof. The components 11, 12, 13, 14, 16 and 17 are permanently interconnected by suitable wiring (not shown) and are coupled or connected to the battery 19 through the switch 18 in the manner indicated below. The microphone 11 and the sound reproducer 13 are disposed on opposite sides of the enclosure 9 with respect to the switch assembly 18 to minimize acoustic and magnetic feedback from the sound reproducer to the microphone. An apertured boss 21 is provided at the output of sound reproducer 13 for communicating with the interior of a flexible sound tube (not shown) that conveys the amplified sound to an earpiece on the ear of the wearer. It will be understood, however, that the assembly 8 may be made completely self-contained by mounting the sound reproducer adjacent the enclosure wall that contacts the mastoid bone of the wearer.

The combined battery holder and switch 18 is mounted within internal chamber 22 disposed in a central portion of the hearing aid enclosure 9. Chamber 22 is externally accessible through an opening 23 disposed in a narrow top wall 24 of the enclosure housing 9. The periphery of the shaped opening 23 is defined by a front wall 26, a rear wall 27 and opposing bevel portions 28a 28b in the top wall 24 (FIG. 7). The bevel portions 28a, 28b extend into the chamber 22 in a non-symmetric manner with respect to the adjacent portions of the top wall 24, so as to inhibit the seating of the switch assembly or battery holder assembly 18 within housing chamber 22, in all but the desired orientation, as will be discussed further in greater detail. To assist the user in such proper orientation, holder assembly 18 preferably includes an indicia means, such as a colored indentation 71 (FIG. 8), which registers with a complementary housing indicia means (not shown) when the battery holder and switch assembly 18 is properly orientated with respect to chamber 22.

A first mounting boss 29 is disposed in the bottom portion of narrow enclosure rear wall 27 and contains a recess 31. Recess 31 cooperates with another recess 32 to fixedly receive an elongated carrier 33 for leaf spring 35, which includes battery spring contact 17. A U-shaped portion 34 is provided near one end of the leaf spring carrier 33, so that leaf spring 35 and the contact 17 may be biased in a direction transverse to the length of leaf spring carrier 33 or, for additional flexibility, may be attached to an arm 35, transversely movable with respect to the leaf spring carrier 33. An additional battery spring contact 36 is affixed to the rear wall 27 of the enclosure and contains at its end a forwardly extending contact portion 36.

The switch assembly 18 comprises an outer cover or housing portion 40 formed of two interconnected complementary cover or housing members 39, 39' and thin annular retainer segment 38, connected thereto (FIG. 1 to 8). The segment 38 may be formed of a metal or appropriate non-brittle wear resistant plastic material. The segment 38 is fixedly mounted to the ends of complementary cover members 39, 39' as by extending portions 72, 74 which enter cover recesses 73, 75, respectively. The cover members 39, 39' are formed into a cover 40, which will be mounted flush with the top wall 24, when the switch assembly 18 is properly inserted within hearing enclosure aid chamber 22. The cover portion 40 has a contour which is complementary to that of opening 23 in the top wall 24, and will effectively define a continuation of the top wall cover 24 over the opening 23, and substantially seal such opening from the entry of contaminants. The cover portion 40 contains bevelled portions 41a, 41b, respectively, which, in conjunction with the bevelled portions 28a, 28b in the top wall 24 of the chamber (FIGS. 1 to 7), are of a predetermined configuration to prevent proper seating of the switch assembly 18 unless it is in its desired orientation. That is, should an attempt be made to improperly place switch assembly 18 in the battery compartment, as is shown in FIG. 7, the switch assembly 18 will not be flush mounted within the enclosure compartment 22 and an overhang 76 will be immediately evident to the user. Effectively, the bevelled portions 41a, 41b of the switch assembly, in conjunction with bevelled portions 28a, 28b in the enclosure top wall 24 serve as a seating means for inhibiting the entry and seating of the switch assembly 18 within the internal chamber 22, when in a predetermined one of two opposite orientations with respect to the enclosure wall 24. This mechanical polarization prevents the insertion of the switch assembly 18 in a manner of energizing the hearing aid circuitry contacts 16, 17 with the improper polarity.

Cover portion 40 is provided with an externally exposed slot 42 (FIGS. 3, 5 to 8A) extending completely through the arcuate cover portion between the ends of the attached annular segment 38. The switch 18 further includes an annular inner battery housing 43 constructed of insulating material such as nylon and substantially concentric with annular segment 38. The outer surface of inner housing 43 is slidably engageable with the inner surface of annular segment 38. Inner housing 43 is provided with a radially extending projection 44 that transversely extends through cover slot 42 (FIGS. 3 and 4). The housing projection 44 terminates in a handle portion 46 adapted to move concentric with and close to an external surface 47 adjoining the slot 42 in outer housing cover 40. The handle portion 46 has a transverse extent greater than the width of the cover slot 42 to facilitate manual movement thereof with a minimum projection above cover 40 and top wall 24.

The central aperture portion 20 of inner housing 43 removably receives energizing battery 19, typically a button-type mercury cell. The battery 19 has an end terminal 48 parallel to the central housing aperture 20. The battery 19 further includes a circumferential or tubular terminal 49 in contact with the inner circular wall of inner housing 43.

Figure 2:
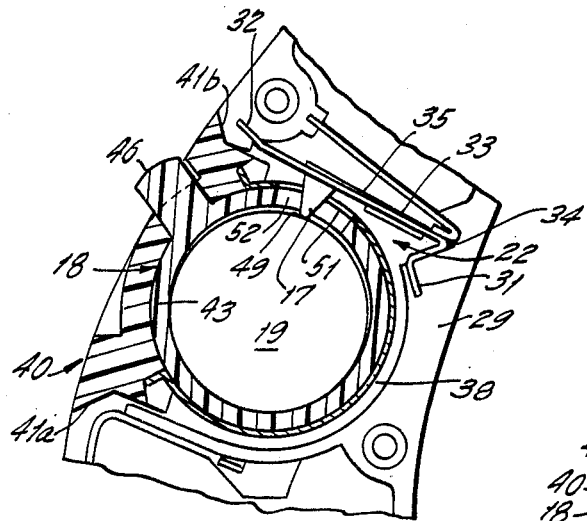
FIG. 2 is a front sectional view of the battery compartment switch of FIG. 1, mounted within the hearing aid compartment and disposed in its ON position.

Referring to FIGS. 2 and 6, annular segment 38 and inner housing 43 are respectively provided with recesses 51, 52 in the walls thereof, which recesses may be aligned, as in FIG. 2, to expose the circumferential terminal 49 of the battery 19 to spring contact 17 of casing enclosure 4 when the handle portion 46 is substantially at one end 53 of the curved cover path 47. For all positions of the handle portion 46 within the curved cover path 47, spring contact 17 is aligned with the recess 51 in the wall of the annular segment 38, and the contact 16 is in contact with the tubular terminal 48 of battery 19.

In operation, the switch 18, receives the battery 19 as described above and is then dropped directly into place in enclosure chamber 22 through the opening 23. Bevelled edges 41a, 41b of cover 40 are seated on and within cooperating bevelled edges 28a, 28b of the top enclosure wall 24 so that the top surface of cover portion 40 is flush with top wall 24. In practice, a slight interference between the side walls of the battery holder 18 and the corresponding side walls in the enclosure 24 (e.g., 55, 28b) help to maintain holder cover 48 firmly within enclosure opening 23. The flush engagement of cover portion 40 places the end terminal 48 of battery 19 firmly in contact with spring contact 16. The outer spring contact 17 is contacted by the outer surface of annular segment 38 and urged to the right (as seen in FIGS. 1, 2, 6, 7) during the inward movement of the switch and battery holder 18 when the latter is placed in chamber 22. When the above flush engagement is obtained, contact 17 is aligned with battery-holder recess 51 and enters therein.

The hearing aid assembly 8 is energized by movement of the battery-holder handle 46 to the extreme rightward position 53 along the path 47 (FIG. 1). As shown in FIG. 2, this movement brings the spring loaded switch contact 17 into firm engagement with tubular terminal 49 of battery 19 through the aligned recesses 52, 51 in the inner battery housing 43 and the annular retainer segment 38, thereby completing the electrical circuit of the hearing aid assembly 8.

To deenergize the hearing aid assembly 8, it is only necessary to move the handle 46 leftward (FIGS. 1, 2, 6) along the curved path 47; no relative motion between the outer housing cover 40 and the enclosure 9 is necessary.

When the handle 46 is moved away from rightward position 53 (FIG. 2) along the path 47, one of the sides of the recess 52 in the inner battery housing 43 movably engages and lifts the free end out of engagement with the outer tubular conductive periphery 49 of battery 19 to the disengaged condition shown in FIG. 6. In the disengaged position, the loaded spring contact 17 bears against the insulated outer surface of the inner battery housing 43 through the recess 51 in the wall of outer retainer segment 38.

When it is desired that the battery 19 be replaced, it is merely necessary for the user to hand-grasp the switch assembly 18 and pull it outward of the chamber 22. The new battery 19 is then inserted within the inner battery housing 43 and the assembly dropped or inserted into hearing aid enclosing chamber 22, with the user making sure that the switch assembly 18 is properly orientated, as facilitated by indicia means 71 and the complementary enclosure indicia means. As noted above, when the switch assembly 18 is properly orientated with respect to the internal enclosure chamber 22, the bevelled edges 28a, 28b of the chamber mate with cover edges 41a, 41b of the switch assembly so as to provide flush mounting therebetween.

As a result of the compactness of the switch 18 and its removability from the enclosure chamber 22 directly through opening 23 without auxiliary pivotal motion, it will be appreciated that the opening 23 and the chamber 22 may be conveniently located anywhere within the enclosure 9. This facilitates optimum component arrangement of the type shown in FIG. 1. Moreover, the engagement of the outer portion of inner housing 43 and the inner portion of housing on the sides of the slot 42 within the switch cover 40 essentially forms a blind opening for the switch 18, so that dirt, lint, perspiration and the like cannot readily enter the interior of the chamber 22 and thus foul the components within the enclosure 9. Also, the complementary contours of the cover 40 and opening 23 effectively close enclosure wall 24 and eliminate another possible point of entry for dirt and contamination.

Reference is now made to FIGS. 9, 10 and 10a, which show a slightly modified battery holder switch assembly 80, constructed in the general manner as switch assembly 18 discussed above. Switch assembly 80 is designed to fit in the same hearing aid internal chamber 22 and cooperates with similarly located contacts 16, 17 as well as bevelled seating portions 28a, 28b of enclosure 9. Switch assembly 80 is, however, a simplification of the arrangement discussed above, in that the outer or cover housing member rotatively seats the inner housing member thereof, without the need for an additional band-like member, formed by annular segment 38 of the above discussed embodiment. More specifically, switch assembly 80 includes complementary outer housing members 82, 84 corresponding to cover 40 of the above described device. These housing cover members are secured to each other, as by integral post member 86 of housing member 82, which enters complementary recess 88 of housing member 84, and post member 90 of housing member 84 which enters recess 92 of housing member 82. Complementary outer members 82, 84 form a top wall 95, which serves as a continuation of the hearing aid enclosure top wall 24. The outer cover on housing members 82, 84 when secured together, as by an appropriate bonding material, also define an arcuate recess 98, which rotatably seats the annular portion of inner battery housing member 100. Inner housing member 100 includes an external handle 102 which transversely extends through slot 104 of the outer housing members. An apertured recess 106 at a predetermined circumferential portion of inner battery housing member 100 will permit the entry of battery contact 17 into the inner space thereof and make switch-contact with the battery member 19 when handle 102 is rotated completely clockwise to the switch ON position, as shown in FIG. 10. The bevelled portions 141a, 141b of the outer housing 95 correspond in function to bevelled portions 41a, 41b of cover 40 of the previously described embodiment to insure proper longitudinal orientation of the switch assembly 80, within the hearing aid battery chamber 22.

FIGS. 11–14 show still another form of combined battery holder and switch assembly in accordance with the instant invention. More specifically, the inner and outer housing members discussed above have been combined into an integral unitary battery housing member 122, which is sealingly rotatable within the hearing aid enclosure. Battery housing 122 has an inner cylindrical opening 124 for reception of the battery 19. Housing member 122 rotatably seats within arcuate portion 126 of the hearing aid device chamber 128, and is retained therein as described below. Housing member 130 has a projecting manual operating handle to permit the user to rotate battery housing member 124 between the OFF and ON positions, as shown in FIGS. 13 and 14, respectively.

The spring assembly 140 is provided mounted to a carrying plate 142. Carrying plate 142 is in turn retained within recessed regions 144, 145 of the hearing aid enclosure 9. The spring assembly 140 includes outer legs 146, 147 positioned about a central spring leg 148. The central leg 148 serves as the battery switch contact and OFF position detent means, while the inner and outer spring legs 146, 147 serve to retain the housing member 122 within the hearing aid chamber 128. More specifically, housing member 124 includes a recess 131, which receives and contact portion 149 of central spring member 148 in the ON position of the switch assembly, as shown in FIG. 14. An indented portion 133 of annular housing member 130 receives contact portion 149 of spring member 148, when handle 130 is turned counter-clockwise from the ON position shown in FIG. 14 to the OFF position shown in FIG. 13.

Considering now the functions of inner and outer spring members 146, 147. Before the entry of battery carrying housing member 122, the springs 146, 148, 147 will be in their relaxed condition as shown in FIG. 12. As the battery housing member 122 is inserted into the enclosure chamber 128, the outer peripheral portion thereof engage spring members 146, 147 pushing them backward against their biasing force. Such urging backwards of the spring members 146, 147 will successively increase until the spring members engage the main diametrical portion of the circular housing member 122. As member 122 is then continually moved inwardly, the springs will begin engaging the periphery of housing member 122 in a manner serving to seat and detent retain said member 122 within enclosure 128.

The integral battery carrier and switch member 122 may only be removed and inserted within compartment 128 when it is in the OFF position as shown in FIG. 13. Further, its handle 130 will only be substantially flush with the contour of the hearing aid enclosure when in the ON position to be shown in FIG. 14.

It is therefore seen that the embodiment of the instant invention provide an extremely simplified and compact combined battery holder and switch assembly, especially adaptable for use in conjunction with hearing aid devices. More particularly, by combining the battery carrier and switch into a single assembly, only one opening need be provided in the hearing aid enclosure for the reception thereof thereby providing substantial versatility in its placement and elimination of associated interconnecting structures.

In the foregoing, this invention has been described in conjunction with preferred illustrative embodiments. Since many variations and modifications will now become obvious to those skilled in the art, it is accordingly desired that the breadth of the claims not be limited to the specific disclosure herein contained.

The embodiments of the invention in which an exclusive privilege or property is claimed are defined as follows:

1. In combination with a hearing aid with an enclosure having an internal chamber accessible through an opening in one wall thereof;
  a switch assembly removably mounted within said chamber through said opening;

said switch assembly including an external portion defining a cover portion substantially sealing said enclosure opening and an internal portion adapted to receive and carry a battery;

first and second enclosure contacts mounted within said chamber for electrical engagement with first and second terminal contacts of the battery carried by said internal portion;

said switch assembly including an externally accessible manual operating means for moving said internal portion of the eswitch assembly between first and second operating positions within said internal chamber;

said switch assembly including means for permitting electrical engagement of said first and second enclosure contacts with the first and second terminal contacts of the battery when in said first operating position, and for preventing electrical engagement of at least one of said enclosure contacts with its respective battery terminal contact and interrupt the hearing aid circuit when said second operating position;

said switch assembly comprising an integral unitary member having said external and internal portions; said unitary member mounted for rotatable movement within said internal chamber, between said first and second switch operating positions.

2. The combination as claimed in claim 1, including detent means for retaining said switch assembly in said chamber at the desired ones of said switch operating positions.

References Cited

UNITED STATES PATENTS

| 2,952,748 | 9/1960 | Posen | 179—107 |
| 2,999,136 | 9/1961 | Holt | 179—107 |
| 3,265,819 | 8/1966 | Hermann | 179—107 |

FOREIGN PATENTS 1,140,614  12/1962  Germany.

KATHLEEN H. CLAFFY, Primary Examiner

A. A. McGILL, Assistant Examiner